(12) United States Patent
Arpa

(10) Patent No.: US 11,341,936 B2
(45) Date of Patent: May 24, 2022

(54) PIECEWISE PROGRESSIVE AND CONTINUOUS CALIBRATION WITH COHERENT CONTEXT

(71) Applicant: Magic Leap, Inc., Plantation, FL (US)

(72) Inventor: Aydin Arpa, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/313,295

(22) Filed: May 6, 2021

(65) Prior Publication Data

US 2021/0366439 A1 Nov. 25, 2021

Related U.S. Application Data

(60) Provisional application No. 63/027,677, filed on May 20, 2020.

(51) Int. Cl.
*G02B 27/00* (2006.01)
*G09G 5/37* (2006.01)
*G02B 27/01* (2006.01)
*G06V 10/44* (2022.01)
*G06V 10/56* (2022.01)

(52) U.S. Cl.
CPC .......... *G09G 5/37* (2013.01); *G02B 27/0172* (2013.01); *G06V 10/44* (2022.01); *G06V 10/56* (2022.01); *G02B 2027/014* (2013.01); *G09G 2320/0693* (2013.01)

(58) Field of Classification Search
CPC .......... G09G 5/37; G06V 10/56; G06V 10/44; G02B 27/0172
See application file for complete search history.

(56) References Cited

U.S. PATENT DOCUMENTS

| | | | |
|---|---|---|---|
| 8,736,636 B2 | 5/2014 | Kang | |
| 8,793,770 B2 | 7/2014 | Lim | |
| 8,823,855 B2 | 9/2014 | Hwang | |
| 8,874,673 B2 | 10/2014 | Kim | |
| 2006/0122515 A1* | 6/2006 | Zeman | H04N 5/2354 600/473 |
| 2013/0147860 A1 | 6/2013 | Ishida | |
| 2015/0086091 A1 | 3/2015 | Rezaee et al. | |
| 2018/0322656 A1 | 11/2018 | Dworakowski et al. | |
| 2019/0057542 A1 | 2/2019 | Bronder et al. | |
| 2021/0256680 A1* | 8/2021 | Xie | G06T 7/70 |

FOREIGN PATENT DOCUMENTS

| | | | | |
|---|---|---|---|---|
| KR | 20060104722 A | * | 10/2006 | G09G 3/006 |
| WO | WO2019199392 A1 | | 10/2019 | |

OTHER PUBLICATIONS

International Search Report and Written Opinion in International Appln. No. PCT/US2021/031105, dated Aug. 12, 2021, 10 pages.

* cited by examiner

*Primary Examiner* — Sarah Lhymn
(74) *Attorney, Agent, or Firm* — Fish & Richardson P.C.

(57) ABSTRACT

A piecewise progressive continuous calibration method with context coherence is utilized to improve display of virtual content. When a set of frames are rendered to depict a virtual image, the VAR system may identify a location of the virtual content in the frames. The system may convolve a test pattern at the location of the virtual content to generate a calibration frame. The calibration frame is inserted within the set of frames in a manner that is imperceptible to the user.

20 Claims, 9 Drawing Sheets

VIRTUAL CONTENT

TEST PATTERN

CALIBRATION FRAME

PIECEWISE PROGRESSIVE AND CONTINUOUS CALIBRATION WITH COHERENT CONTEXT

CROSS-REFERENCE TO RELATED APPLICATION

This application claims the benefit of U.S. Provisional Patent Application No. 63/027,677, filed May 20, 2020, which is incorporated herein by reference in its entirety.

FIELD

This specification generally relates to image processing and display calibration.

BACKGROUND

Display devices may project images onto a display interface. However, an image may not appear as desired if there is a problem with the display or display interface. For example, an image may not appear as desired if the display interface is deformed or misaligned.

SUMMARY

Innovative aspects of the subject matter described in this specification relate to calibration of display devices used in virtual or augmented reality (VAR) systems. In particular, VAR systems can be used to display virtual content to augment physical reality views. When one or more display-related components of the VAR system are deformed or are not operating as desired, calibration may be required to ensure that the virtual content is being displayed properly.

According to implementations described, a piecewise progressive continuous calibration method with context coherence is utilized to improve display of virtual content. A set of frames is rendered to depict a virtual image. The VAR system may identify a location of virtual content in the set of frames. The system may convolve a test pattern at the location of the virtual content to generate a calibration frame. The calibration frame is inserted within the set of frames in a manner that is imperceptible to the user since exposure of the calibration frame is for such a short time.

The described calibration technique is advantageous in that it calibrates the display only when and where virtual content is being displayed to the user. This calibration method performs exceedingly well if the virtual content has strong contextual coherence and spatial distribution. Other benefits include a low computational burden, a low reliance on eye tracking, and a low degradation risk. Such benefits allow the calibration technique to perform well in high frequency displays.

Other implementations of this aspect include corresponding systems, apparatus, and computer programs recorded on computer storage devices, each configured to perform the operations of the methods.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
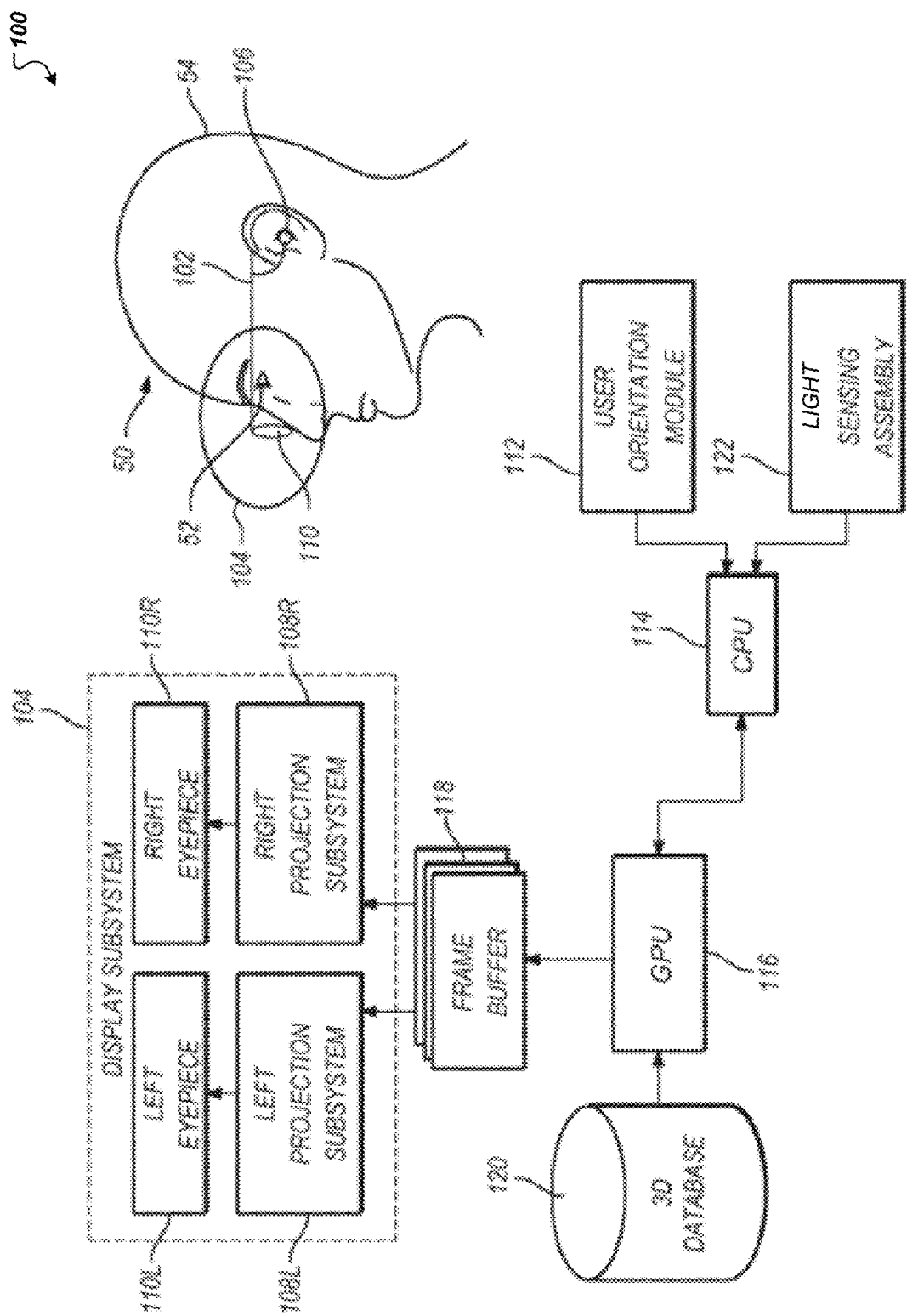
FIG. 1 depicts an example implementation of a virtual or augmented reality (VAR) system.

FIG. 1 depicts an example implementation of a user 50 utilizing a VAR system 100. The VAR system 100 includes a frame structure 102, a display subsystem 104, a speaker 106, an eyepiece 110, a user orientation module 112, a computer processing unit (CPU) 114, a graphics processing unit (GPU) 116, a frame buffer 118, a three-dimension (3D) database 120, and a light sensing assembly 122. The VAR system 100 may be operated as an augmented reality system that can provide images of virtual objects intermixed with physical objects in a field of view of the user 50.

As shown in FIG. 1, the frame structure 102 may be worn on a head of the user 50. The frame structure 102 may be integrated, connected to, or coupled to the speaker 106 and the display subsystem 104. The display subsystem 104 may include a left eyepiece 110L, a right eyepiece 110R, a left projection system 108L, and a right projection system 108R.

The speaker 106 may include a single speaker or a pair of speakers. For example, one speaker may be configured to output audio data in one ear, and a second speaker may be configured to output audio data in the second ear of the user 50. The speaker 106 may be positioned adjacent to the ear canal of the user 50. In general, various types of speakers may be used, e.g., headsets with speakers, ear phones, AirPods®. The speaker 106 may be connected to other components of the VAR system 100 wirelessly or through a wired connection. For example, in some implementations, the speaker 106 may be connected to other components of the VAR system 100 through a short-distance communication protocol such as Bluetooth.

The display subsystem 104 may be positioned above the nose and in front of the eyes 52 of the user 50, similar to the position of lenses of eye glasses. The display subsystem 104 may be configured to present the eyes 52 of the user 50 with photo-based radiation patterns that can be comfortably perceived as augmentations to physical reality, with high quality two-dimensional (2D) or three-dimensional (3D) image content. The display subsystem 104 may output a sequence of frames obtained from the frame buffer 118 at various frequencies. In some cases, the display subsystem 104 may output frames at a high frequency to provide the perception of a single coherent scene.

The eyepiece 110 includes a partially transparent left eyepiece 110L and a partially transparent right eyepiece 110R. The left and right eyepieces 110L and 110R effectively operate as display screens or display interfaces when an image is projected onto them. In some implementations, the left and right eyepieces (or display screens) 110L, 110R display may be "optical see-through" display through which the user can directly view light from real objects via a transparent (or semi-transparent) element. The transparent element may superimpose light from the projection subsystems 108L, 108R over the user's view of the real world.

In some implementations, eyepieces 110L and 110R may take the form of a waveguide apparatus that includes a planar optical waveguide and one or more diffractive optical elements (DOEs) associated with the planar optical waveguide. The waveguide apparatus may comprise multiple planar optical waveguides and DOEs respectively associated with the planar optical waveguides.

The left and right projection subsystems 108L, 108R may project left and right monocular images on to the left and right eyepieces 110L, 110R, respectively. The eyepieces 110L, 110R can be placed in front of the eyes 52 of the user 50 to view the monocular images as a binocular image. In addition, the eyepieces 110L, 110R may be placed in the user's 50 field of view between the eyes 52 of the user 50 and an ambient environment, such that direct light from the ambient environment travels through the eyepieces 110L, 110R to the eyes 52 of the user 50.

The projection assemblies 108L, 108R may provide scanned light respectively to the eyepieces 110L, 110R. In some implementations, the projection subsystems 108L, 108R may be implemented as an optical fiber scan-based projection device, and the eyepieces 110L, 110R may be implemented as a waveguide-based display into which the scanned light from the respective projection subsystems 108L, 108R is injected. Each of the projection subsystems 108L, 108R may comprise a spatial light modulator ("SLM"), such as a liquid crystal on silicon ("LCoS") component, or a micro-electromechanical ("MEMs") scanning mirror.

The VAR system 100 may also include one or more sensors mounted to the frame structure 102 for detecting the position and movement of the head 54 of the user 50 and/or the eye position and inter-ocular distance of the user 50. Such sensor(s) may include image capture devices (such as cameras), microphones, inertial measurement units, accelerometers, compasses, GPS units, radio devices, and/or gyroscopes.

The user orientation detection module 112 may be configured to detect the instantaneous position of the head 54 of the user 50 and to determine the position of the head 54 of the user 50 based on position data received from the sensor(s). Detecting the instantaneous position of the head 54 may also facilitate determination of an object that the user 50 is looking at. The user orientation module 112 may also track the eyes 52 of the user 50 based on the tracking data received from the sensor(s).

The light sensing assembly 122 may sense light rays exiting both eyepieces 110L, 110R. In addition, as explained in more detail below, the light sensing assembly 122 may be configured to sense at least one parameter indicative of a mismatch between the displayed left and right monocular images as the binocular image.

The VAR system 100 may also include a control subsystem comprising various software and hardware components. In some implementations, the control subsystem may include a central processing unit (CPU) 114, a graphics processing unit (GPU) 116, one or more frame buffers 118, and a 3D database 120 for storing three-dimensional scene data. The CPU 114 may control the overall operation of the VAR system 100, while the GPU 116 renders frames (e.g., translating a 3D scene into a 2D image) from the 3D data stored in the 3D database 120 and stores these frames in the frame buffer(s) 118.

In general, the control subsystem may include various controllers such as microcontrollers, microprocessors, CPUs, digital signal processors, GPUs, application specific integrated circuits (ASICs), programmable gate arrays (PGAs), field PGAs (FPGAs), and/or programmable logic controllers (PLUs). The control subsystem may include and/or communicates with one or more processors, such as the CPU 114 and GPU 116, that perform the operations described in this specification, e.g., through execution of executable instructions. While not illustrated, one or more integrated circuits may be used to control the reading into and/or reading out of one or more frames from the frame buffer 118 and the operations of the left and right projection subsystems 108L, 108R of the display subsystem 104.

The VAR system 100 may be configured to operate in different modes. For example, in one mode, cameras in the VAR system 100 may be used to capture images of the ambient environment. The VAR system 100 may inter-mix virtual images into data representing the images of the ambient environment to render a mixed reality image for a user to view. In another mode, the VAR system 100 may include one or more partially transparent surfaces through which the ambient environment can be seen by a viewer. The VAR system 100 produces images of virtual objects which are transposed onto the partially transparent surfaces.

The VAR system 100, and the various techniques disclosed herein, may also be employed in applications other than augmented reality and virtual reality subsystems. While certain implementations are described in the context of an augmented reality subsystem or virtual reality subsystem, the VAR system 100 is not limited to such subsystems.

In augmented reality applications, it may be desirable to spatially position various virtual objects relative to respective physical objects in a field of view of the user 50. As noted above, the projection assemblies 108L, 108R may project the virtual objections on to the eyepieces 110L, 110R for display. Virtual objects may be referred as virtual tags, tag, or call outs, and may be implemented in a variety of forms. Examples of virtual objects may include, but are not limited to, a virtual text object, a virtual numeric object, a virtual alphanumeric object, a virtual tag object, a virtual field object, a virtual chart object, a virtual map object, a virtual instrumentation object, or a virtual visual representation of a physical object.

As noted above, the VAR system 100 included eyepieces 110L, 110R integrated with the frame structure 102. As frame structures become lighter in weight, thinner, and more flexible to facilitate transportation, comfort, and aesthetics, frame structures have also become more susceptible to deformations. These deformations may introduce distortions and other error into the virtual binocular image.

Figure 2A:
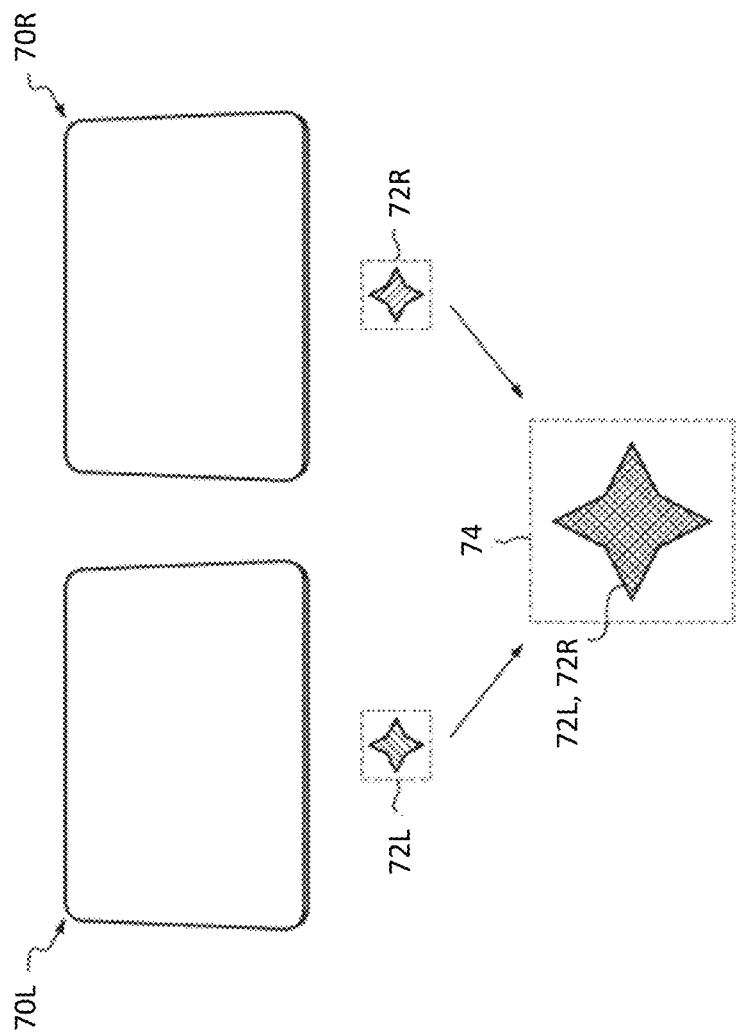
FIG. 2A depicts a plan view of aligned left and right eyepieces.

For example, as illustrated in 2A and 2B, virtual content 72L, 72R may be presented and perceived through the pair of eyepieces 70L, 70R to left and right eyes, respectively. In FIG. 2A, the two eyepieces 70L, 70R are aligned with one another in an ideal manner. The alignment of the two eyepieces 70L, 70R has not, for example, been changed since the time of manufacture of the frame structure 102.

Figure 2B:
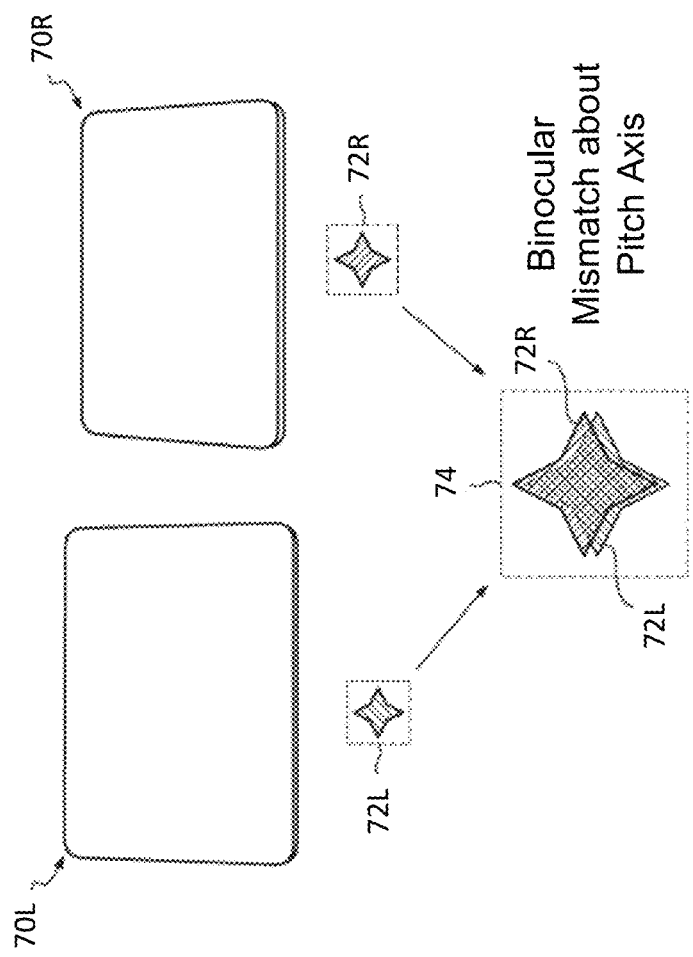
FIG. 2B depicts a plan view of misaligned left and right eyepieces.

However, if the alignment of the two eyepieces 70L, 70R were to change, the virtual content 74 presented by both eyepieces 70L, 70R may be distorted. For example, FIG. 2B depicts an instance in which the alignment of the pair of eyepieces 70L, 70R about the Pitch-axis is mismatched. Other types of misalignments include, but are not limited to, misalignments along the Roll-axis or the Yaw-axis. In general, misalignments between the left and right eyepieces 70L, 70R may result in perceived translational and/or rotational misalignments between left virtual content 72L and the right virtual content 72R. Misalignments can cause physiological strain on the eyes of a user 50. Furthermore, and more generally, human beings can be sensitive to binocular rotational misalignment of virtual images about the Pitch, Roll, and Yaw axes down to 4, 6, and 10 arcminutes, respectively.

Figure 3A:
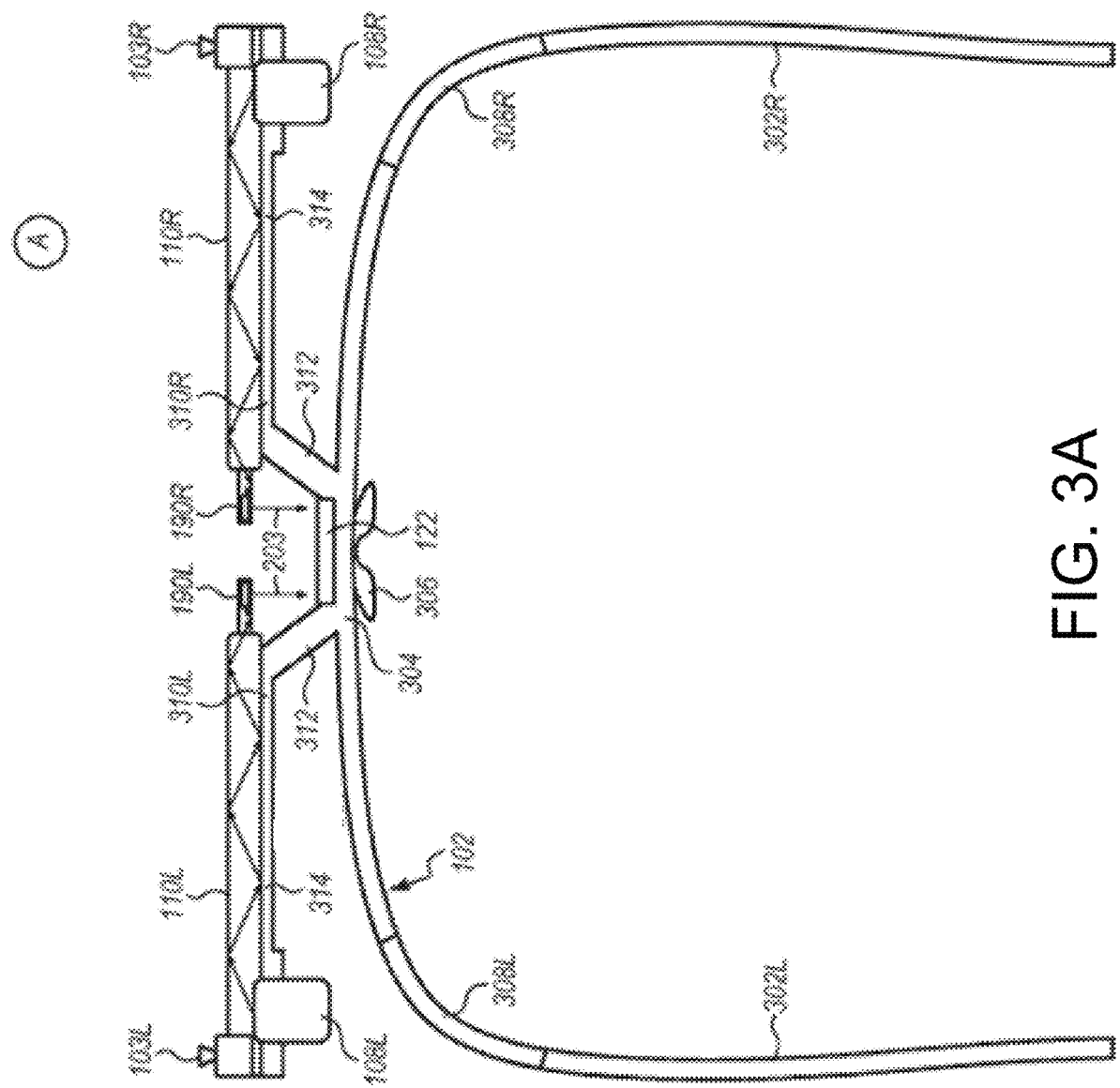
FIG. 3A depicts a top view of a frame structure with aligned left and right eyepieces.
Figure 3B:
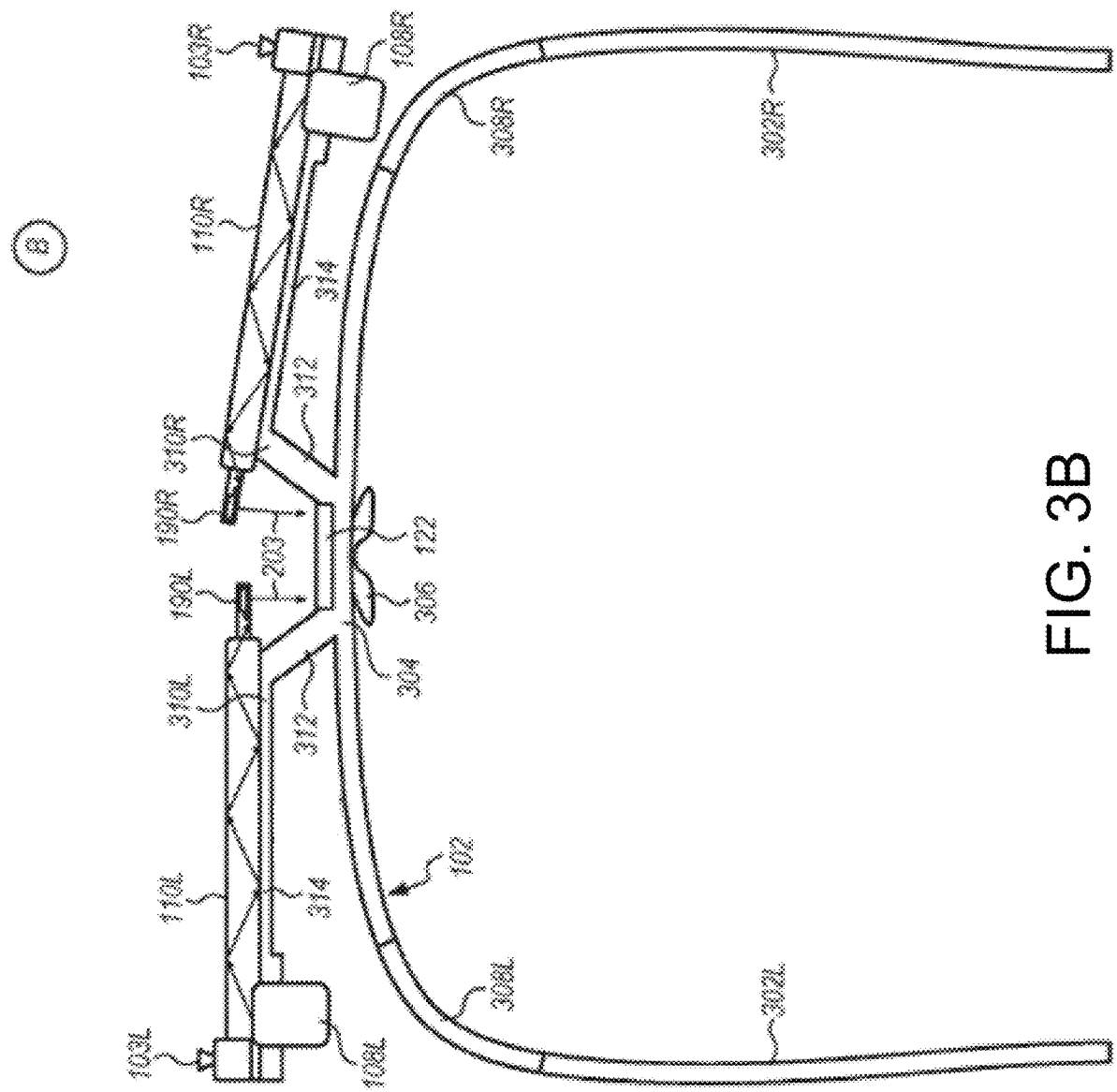
FIG. 3B depicts a top view of a frame structure with misaligned left and right eyepieces.

FIGS. 3A and 3B depict another example of a frame structure 102 with aligned and misaligned eyepieces 110L and 110R. The frame structure 102 includes left and right cantilevered arms 310L, 310R, left and right temple arms 302L, 302R, left and right hinges 308L, 308R, nose piece 306, and bridge 304. The left and right temple arms 302L, 302R are designed to engage the head 54 of the user 50 such that the left and right eyepieces 110L, 110R are located in front of the eyes 52 of the user 50. The temple arms 302L, 302R include left and right hinges 308L, 308R, respectively, to facilitate flexing of the arms 302L, 302R for proper fitting of the frame structure 102 to the head 54 of the user 52. The nose piece 306 is configured to be placed on the nose of the user 52, and may have a convex surface that conforms to the shape of the nose of the user 52.

The left and right cantilevered arms 310L, 310R are connected to a cantilever arm portion 312 extending away from the bridge 304. An affixation arm portion 314 extends from the respective cantilever arm portion 312 in a plane parallel to the plane of the eyes 52 of the end user 52. The left and right eyepieces 110L, 110R are respectively affixed to the affixation arm portions 314. The left and right projection subassemblies 108L, 108R are respectively affixed to the outer ends of the affixation arm portions 314 to facilitate provision of the light beams respectively into the left and right eyepieces 110L, 110R. In this manner, light rays may exit the left and right eyepieces 110L, 110R to display left and right monocular images as a binocular image to the user 50.

The ends of the left and right cantilevered arms 310L, 310R away from the nose of the user 50 includes cameras 103L, 103R respectively. The left camera 103L and the right camera 103R are configured to obtain images of the user's environment, e.g., the objects in front of the user 50.

Referring to FIG. 3A, in state A, the VAR system 100 displays virtual monocular images through both left and right eyepieces 110L, 110R. The left projection subsystem 108L may project light representative of virtual content toward left eyepiece 110L, which in turn in-couples and guides this light toward the diffractive optical elements (DOEs) configured to provide orthogonal pupil expansion (OPE) and/or exit pupil expansion (EPE) functionality. While a majority of the guided light may exit the eyepiece 110L as the light traverses the DOE(s) (e.g., directed toward a user's left eye), a portion of this light may continue on toward an out-coupling DOE 190L, where it may be coupled out of the eyepiece 110L as light (represented by the light ray 203) and at least partially intercepted by the light sensing assembly 122. The right projection subsystem 108R, along with right eyepiece 110R and DOE(s) thereof (e.g., out-coupling element 190R, in-coupling element (ICE), OPE, and EPE), may operate in a similar manner to projection subsystem 108L in state A. For example, the projection subsystem 108R, right eyepiece 110R, and DOE(s) thereof may present virtual content to a user's right eye, and out-couple and direct light representative of virtual content to the light sensing assembly 122 through the out-coupling DOE 190R.

In state B (shown in FIG. 3B), the left and right eyepieces 110L, 110R are rotationally-misaligned with each other about the Yaw axis. This may result, for example, from a deformation or cantilevering of the arm portion 312 of the right cantilevered arm 310R. When such a misalignment occurs, the angle at which light (represented by the light ray 203) exits the out-coupling DOE 190R of right eyepiece 110R in state B differs from the angle at which light (represented by the corresponding light ray 203) exits the out-coupling DOE 190R of right eyepiece 110R in state A and the angle at which the light (represented by the light ray 203) exits the out-coupling DOE 190L of left eyepiece 110L in both states A and B. Based on data output from the light sensing assembly 122, the VAR system 100 can detect such a deformation or mismatch between the two eyepieces 110L, 110R.

In particular, the CPU 114 may receive and process data obtained by the light sensing assembly 122. The CPU 114 may compare the data derived from the light incident on the light sensing assembly 122 when the frame structure 102 is in State A with the data derived for the light incident on the light sensing assembly 122 when the frame structure 102 is in State B, and determine a relative deformational state of the left and right eyepieces 110L, 110R. In response to detecting the relative deformational state or the misalignment of virtual images, the VAR system 100 may perform one or more calibration procedures to compensate the virtual or displayed images according to the deformation/misalignment.

Figure 4:
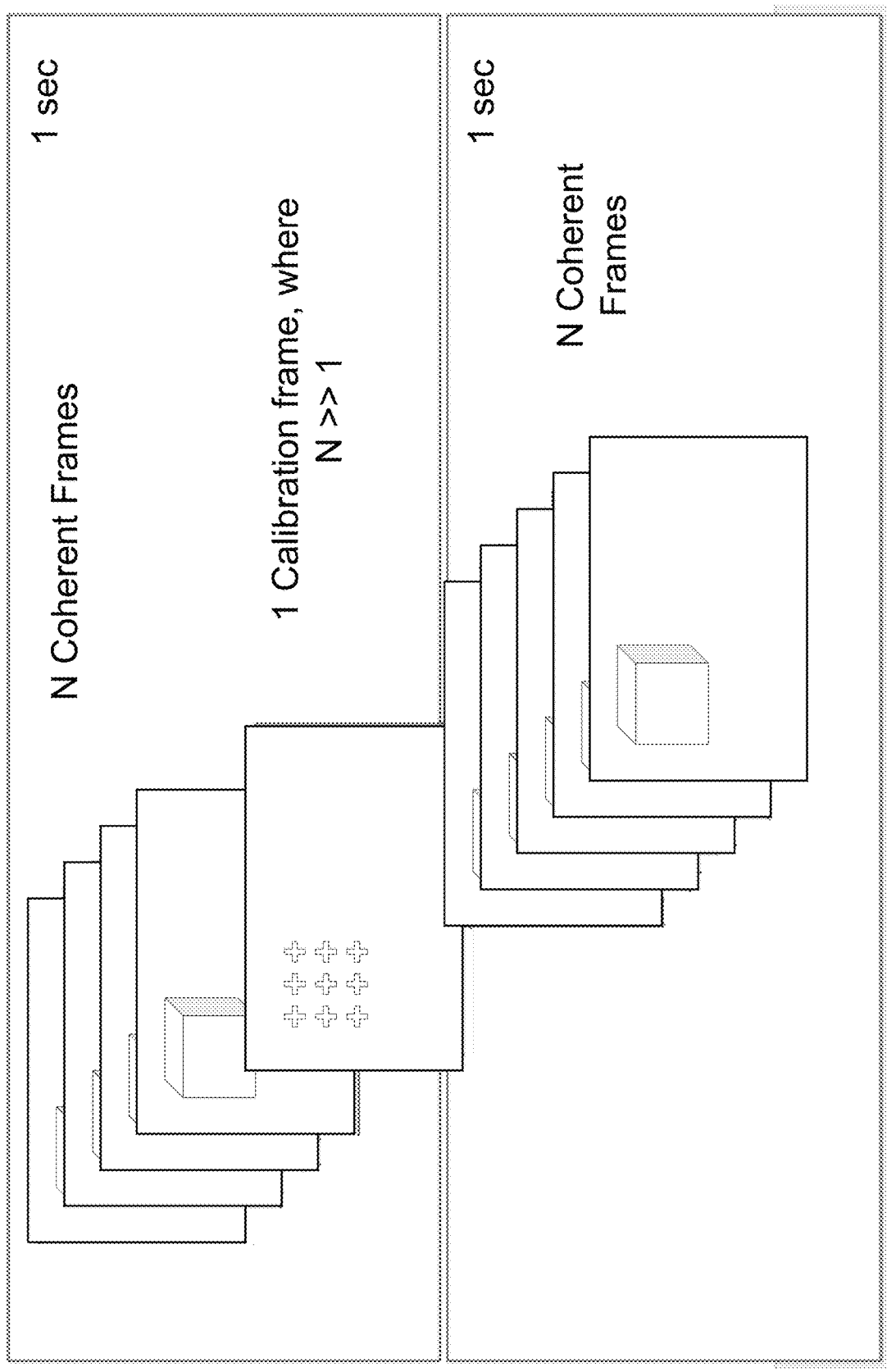
FIG. 4 depicts a series of frames including an example calibration frame.

FIGS. 4-7 depict an example implementation of a calibration technique that uses a calibration frame and coherent context to perform calibration. The calibration technique may be executed by one or more processors (referred to herein below simply as processor) such as the CPU 114 or GPU 116. The processor may determine a number of frames to render according to a refresh rate of the display subsystem 104. For example, if the refresh rate of the display subsystem 104 is 120 Hz, the display subsystem 104 may generate a total of 120 frames including one calibration frame for every 119 frames. More generally, as shown in FIG. 4, if N is the refresh rate, the display subsystem 104 may generate one test frame for every N−1 frames.

In some implementations, to perform the calibration in a computationally efficient manner, the processor may select one of the N−1 frames as a representative virtual content frame. The processor may determine the location of content in the representative virtual content frame. To do this, the processor may use various content detection methods. For example, edge detection and chromatic pattern detection techniques may be used to detect the location of content in a frame.

In the example shown in FIG. 4, the processor determines that virtual content is located in an upper left region of a frame. The processor may identify the location of pixels and pixel values associated with content detected in a frame and may store data indicative of the pixel locations and pixel values in a memory. In some implementations, the representative virtual content frame may be determined by averaging the pixel values across the N−1 rendered frames. Pixel values may include values such as intensity values or RGB color values.

Figure 5:
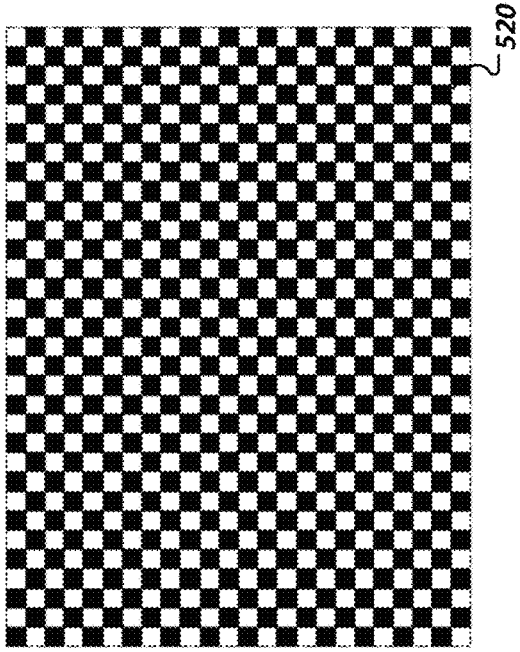
FIG. 5 depicts an illustration of a calibration frame.
Figure 5:
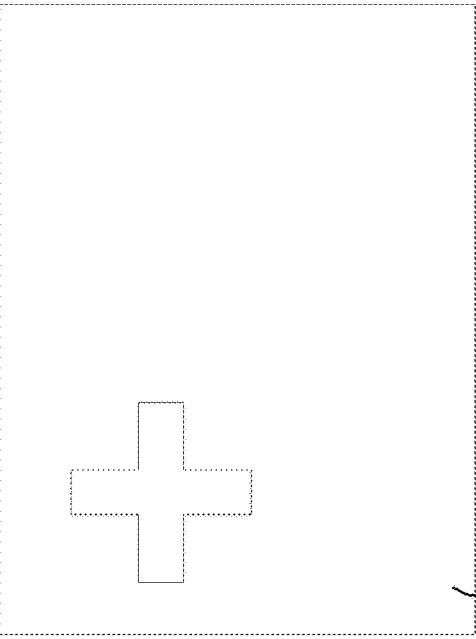
Figure 5:
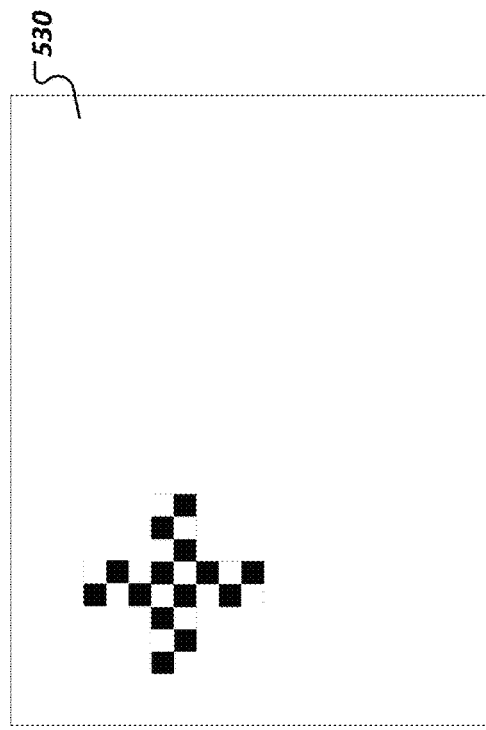

After determining the location of the virtual content, the processor may generate a calibration frame. Referring to the illustrated example shown in FIG. 5, the processor may convolve a frame 510, such as the representative virtual content frame, with a test pattern 520 to generate a calibration frame 530. In FIG. 5, the virtual content is represented by a single plus sign although the virtual content may be rendered in various shapes, sizes, and numbers. In addition, although FIG. 5 depicts the use of a checker board pattern as the test pattern 520, in general, various types of test patterns, such as grids and crosses, may be used. The calibration frame may be generated by applying a patterned mask to a frame of virtual content. The resulting calibration frame may resemble a frame of virtual content with a test pattern subtracted therefrom.

Figure 6:
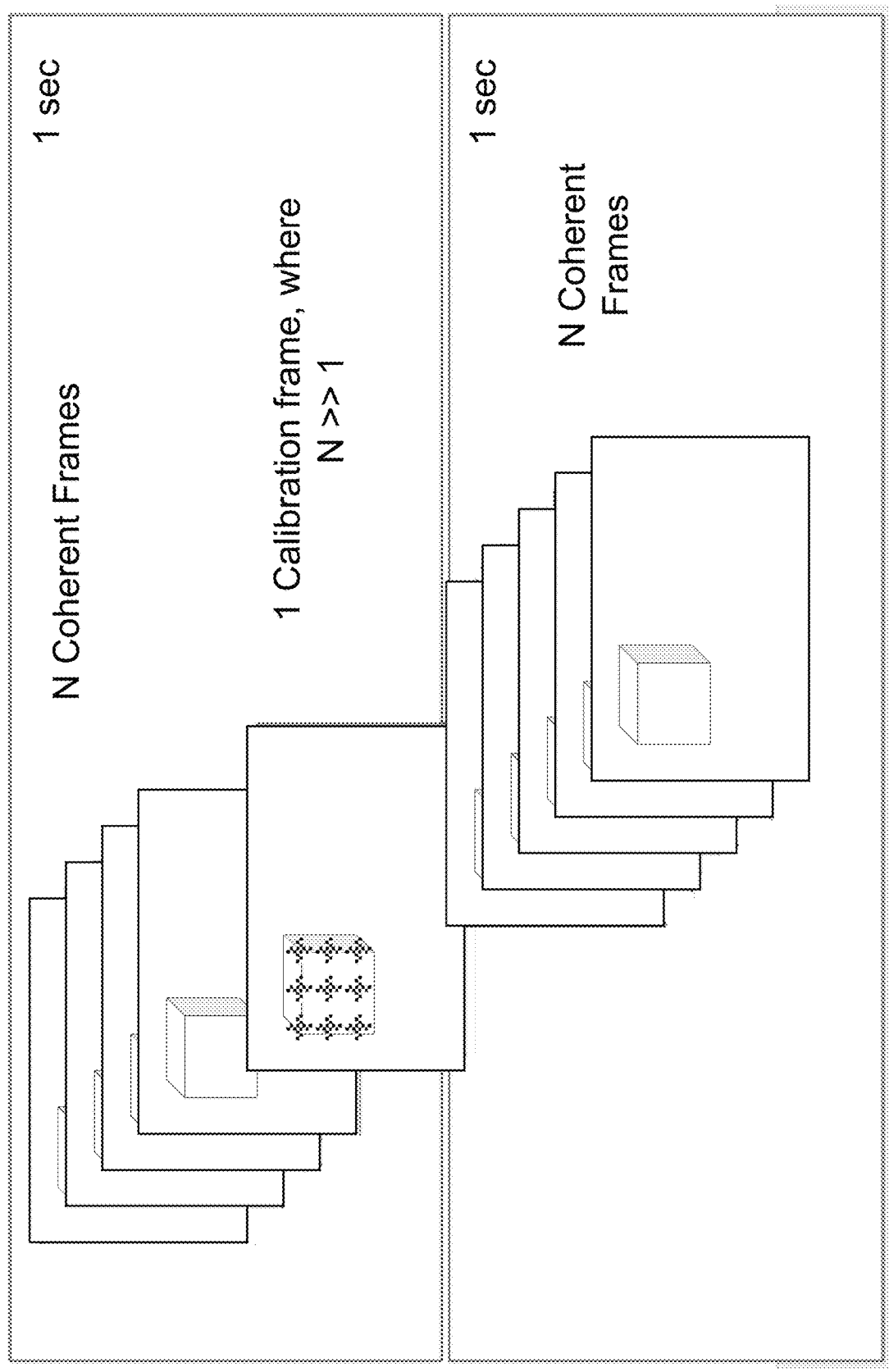
FIG. 6 depicts a series of frames including a calibration frame with a test pattern and virtual content.

FIG. 6 depicts an example of N coherent frames including one calibration frame. The calibration frame in FIG. 6 shows virtual content in the form of a cube that is convoluted with a test pattern in the form of a plurality of plus signs. Advantageously, image processing is only performed in the region in which virtual content is present.

The generated calibration frame may be inserted into the N−1 frames. In general, the calibration frame may be inserted after any frame of the plurality of frames. For example, the calibration frame may be inserted in the middle of the plurality of frames or after the first 10 frames. By inserting the calibration frame in this manner, the calibration frame is less noticeable to the user because the human brain tends to fill in, filter out, or ignore brief anomalies (e.g., "holes") in images received from the eyes.

In some implementations, the VAR system 100 may be calibrated for the colors of virtual content being displayed to the user. For example, if only blue virtual content is being displayed, then the processor may use a blue test pattern to perform calibration. If only red virtual content is being displayed, then the processor may use a red test pattern to perform calibration. If only green virtual content is being displayed, then the processor may use a green test pattern to perform calibration. If virtual content having a combination of red, blue, and green colors is being displayed, then the processor may perform calibration using a combination of red, blue, and green calibration frames.

To further reduce the difference in perception of the calibration frame, various characteristics, such as the intensity, of the calibration frame may be configured to match or resemble the characteristics of the representative virtual content frame. For example, if the intensity of the virtual content is determined to be greater than or equal to a minimum threshold level of intensity, then the intensity of the calibration frame may be equal to that of the corresponding virtual content. If the intensity of the virtual content is determined to be less than the minimum threshold level of intensity, then the intensity of the calibration frame may be set to the minimum threshold level of intensity.

In some implementations, image properties of the calibration frame, such as the contrast ratio or brightness, could be configured to further reduce the perceptibility of test frames. In some implementations, the calibration frame may be diluted by hiding the test image behind edges of the virtual content. The calibration frame may be further camouflaged by using texture and color similar to the virtual content.

Figure 7:
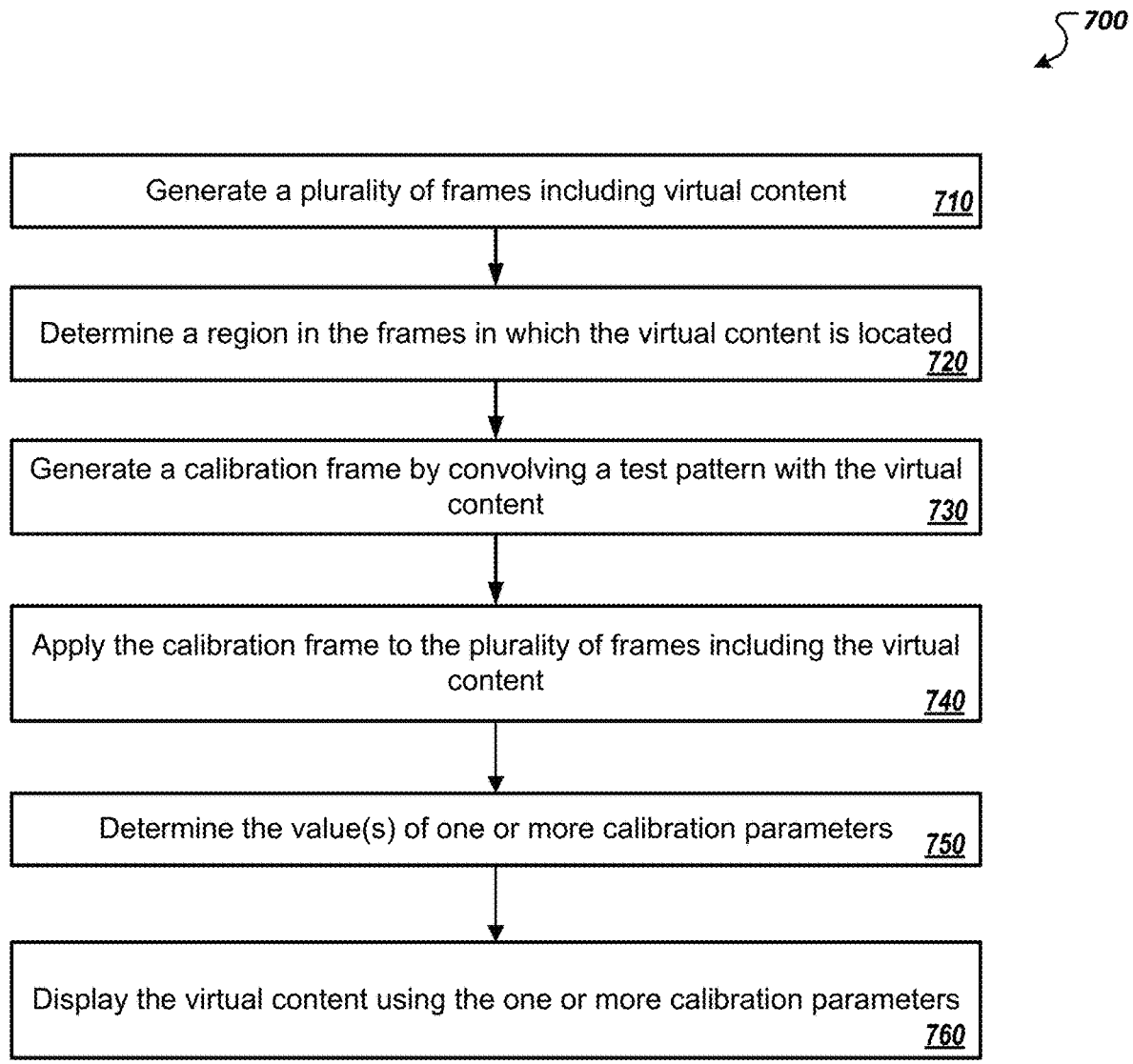
FIG. 7 depicts a flow chart of a method for implementing display calibration.

FIG. 7 depicts a flow chart of a method for implementing display calibration. As explained above, in a VAR system, virtual reality content may be generated to display or augment a user's view of physical reality on a display. To provide virtual content on a display, a processor of the VAR system may generate a plurality of frames that include virtual content (710). The number of frames generated may depend on the refresh rate. For example, if the refresh rate is 120 Hz, the processor may generate 120 frames per second.

Using the techniques described above with respect to FIGS. 4-6, the processor may determine a region in the generated frames where the virtual content is located (720). For example, edge detection and chromatic pattern detection techniques may be used to detect the location of content in a frame.

After determining the location of the virtual content, the processor may generate a calibration frame (730). As explained above, the processor may apply one of several possible test patterns and convolve it with the virtual content. Because the processor has already identified the location of the virtual content, the convolution may be performed in a computationally efficient manner by performing the convolution only in the region where the virtual content is located. The convolution of the test pattern and virtual content results in a calibration frame that resembles the virtual content with the test pattern subtracted from the virtual content. In some implementations, multiple copies of the calibration frames may be generated.

The generated calibration frame is then applied to the frames generated to display the virtual content according to the refresh rate (740). The calibration frame may be inserted in any location amongst the frames that include the virtual content. If needed, multiple calibration frames can be generated and inserted within the frames that include the virtual content. The multiple calibration frames may be inserted randomly into the set of frames that include the virtual content or according to a predetermined criteria set by the VAR system designer.

Based on the calibration frame(s), the processor may determine the value of one or more calibration parameters to improve the display of the virtual content where desired on the left and right eyepieces 110L, 110R (750). For example, the processor may determine the translation and/or rotation parameters for the eyepieces 110L, 110R (e.g., adjustments to the Pitch, Roll, and/or Yaw axes) and translation and/or rotation parameters for left and right projection subsystems 108L, 108R that would result in the virtual content being displayed in the desired manner.

After determining the calibration parameters, the VAR system may display the virtual content after adjusting its display subsystem 104 using the calibration parameters (760). For example, the projection of the virtual content or the position of the eyepieces 110L/110R may be adjusted to according to the calibration parameters to improve display of the virtual content. If additional calibration is required, the VAR system may repeat the calibration method described above. In some implementations, if virtual content display is not being rendered as desired when a single calibration frame is being used, the processor may generate multiple calibration frames and insert the multiple calibration frames within the generated plurality of frames that include virtual content.

This above-described calibration technique is advantageous in that it calibrates the display only when and where virtual content is being displayed to the user. This calibration method performs exceedingly well if the virtual content has strong contextual coherence and spatial distribution. Other benefits include a low computational burden, a low reliance on eye tracking, and a low degradation risk. Such benefits allow the calibration technique to perform well in high frequency displays.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented using one or more computer programs or non-transitory computer-readable storage media that includes instructions that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example, semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

Computer-readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program, also known as a program, software, software application, script, plug-in, or code, may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data in a single file dedicated to the program in question, or in multiple coordinated files. A computer program may be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Moreover, a computer may be embedded in another device, e.g., a tablet computer, a mobile telephone, a personal digital assistant (PDA), a mobile audio player, a VAR system, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and may even be claimed as such, one or more features from a claimed combination may, in some cases, be excised from the combination, and the claimed combination may be directed to a sub-combination or variation of a sub-combination. For example, although the mapping operation is described as a series of discrete operations, the various operations may be divided into additional operations, combined into fewer operations, varied in order of execution, or eliminated, depending on the desired implementation.

Similarly, the separation of various system components in the embodiments described above should not be understood as requiring such separation in all embodiments, and it should be understood that the described program components and systems may generally be integrated together in a single software product or packaged into multiple software products. For example, although some operations are described as being performed by a processing server, one of more of the operations may be performed by the smart meter or other network components.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together. The term "and/or" is also intended to be construed in this manner.

The use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

What is claimed is:

1. A computer-implemented method comprising:
   generating frames that include virtual content;
   determining a location of the virtual content in the frames;
   convolving, by a processor, a test pattern at the location of the virtual content;
   generating a calibration frame based on the convolving; and
   applying the calibration frame to the frames that include the virtual content.

2. The computer-implemented method of claim 1, wherein determining the location of the virtual content in the frames comprises:
   applying one or more of edge detection or chromatic pattern detection to identify a region in the frames that include the virtual content;
   identifying a location of pixels and pixel values in the region; and
   storing data indicative of the location of the pixels and pixel values in a memory.

3. The computer-implemented method of claim 1, wherein convolving the test pattern at the location of the virtual content comprises:
   selecting a representative virtual content frame; and
   convolving the test pattern at the location of the virtual content in the representative virtual content frame.

4. The computer-implemented method of claim 1, further comprising:
   determining a refresh rate of a display of a virtual or augmented reality system,
   wherein a number of the frames that include the virtual content is based on the refresh rate.

5. The computer-implemented method of claim 1, wherein applying the calibration frame to the frames that include the virtual content comprises:
   inserting the calibration frame between two of the frames that include the virtual content.

6. The computer-implemented method of claim 1, wherein generating the calibration frame comprises:
   determining an intensity level of the virtual content in the frames;
   determining that the intensity level of the virtual content in the frames is less than a minimum threshold intensity level; and
   generating the calibration frame having an intensity level matching the minimum threshold intensity level.

7. The computer-implemented method of claim 1, comprising:
   in response to applying the calibration frame to the frames, determining one or more calibration parameters; and
   displaying the virtual content at a display using the calibration parameters.

8. The computer-implemented method of claim 1, wherein generating the calibration frame comprises:
   hiding a test image behind edges of the virtual content in the calibration frame; and
   generating the calibration frame using a test pattern that has the same color as a color of the virtual content.

9. A virtual or augmented reality system, comprising:
   a frame structure comprising a display device configured to display data; and
   a processor coupled to the frame structure, the processor configured to:
     generate frames that include virtual content;
     determine a location of the virtual content in the frames;
     convolve a test pattern at the location of the virtual content;
     generate a calibration frame based on the convolving; and
     transmit the calibration frame and the frames that include the virtual content to the display device,
   wherein, in response to receiving the calibration frame and the frames that include the virtual content from the processor, the display device is configured to display the calibration frame and the frames that include the virtual content.

10. The virtual or augmented reality system of claim 9, wherein the processor being configured to determine the location of the virtual content in the frames comprises the processor being configured to:
apply one or more of edge detection or chromatic pattern detection to identify a region in the frames that include the virtual content;
identify a location of pixels and pixel values in the region; and
store data indicative of the location of the pixels and pixel values in a memory.

11. The virtual or augmented reality system of claim 9, wherein the processor being configured to convolve the test pattern at the location of the virtual content comprises the processor being configured to:
select a representative virtual content frame; and
convolve the test pattern at the location of the virtual content in the representative virtual content frame.

12. The virtual or augmented reality system of claim 9, wherein:
the processor is configured to determine a refresh rate of a display of a virtual or augmented reality system; and
a number of the frames that include the virtual content is based on the refresh rate.

13. The virtual or augmented reality system of claim 9, wherein the processor being configured to apply the calibration frame to the frames that include the virtual content comprises the processor being configured to:
insert the calibration frame between two of the frames that include the virtual content.

14. The virtual or augmented reality system of claim 9, wherein:
the processor is configured to determine one or more calibration parameters in response to applying the calibration frame to the frames; and
the display device is configured to display the virtual content using the calibration parameters.

15. A non-transitory computer-readable storage medium comprising instructions, which, when executed by one or more computer processors, cause the one or more computer processors to perform operations comprising:
generating frames that include virtual content;
determining a location of the virtual content in the frames;
convolving, by a processor, a test pattern at the location of the virtual content;
generating a calibration frame based on the convolving; and
applying the calibration frame to the frames that include the virtual content.

16. The non-transitory computer-readable storage medium of claim 15, wherein determining the location of the virtual content in the frames comprises:
applying one or more of edge detection or chromatic pattern detection to identify a region in the frames that include the virtual content;
identifying a location of pixels and pixel values in the region; and
storing data indicative of the location of the pixels and pixel values in a memory.

17. The non-transitory computer-readable storage medium of claim 15, wherein convolving the test pattern at the location of the virtual content comprises:
selecting a representative virtual content frame; and
convolving the test pattern at the location of the virtual content in the representative virtual content frame.

18. The non-transitory computer-readable storage medium of claim 15, further comprising:
determining a refresh rate of a display of a virtual or augmented reality system,
wherein a number of the frames that include the virtual content is based on the refresh rate.

19. The non-transitory computer-readable storage medium of claim 15, wherein applying the calibration frame to the frames that include the virtual content comprises:
inserting the calibration frame between two of the frames that include the virtual content.

20. The non-transitory computer-readable storage medium of claim 15, wherein the operations further comprise:
in response to applying the calibration frame to the frames, determining one or more calibration parameters; and
displaying the virtual content at a display using the calibration parameters.

* * * * *